United States Patent [19]

Dromard et al.

[11] Patent Number: 5,418,273

[45] Date of Patent: May 23, 1995

[54] AQUEOUS SUSPENSIONS OF PRECIPITATED SILICA WITH ANIONIC DISPERSANT AND ALUMINUM COMPOUND

[75] Inventors: Adrien Dromard, Asnieres; Claude Richard, Lyon, both of France

[73] Assignee: Rhone-Poulenc Chimie, Courbevoie, France

[21] Appl. No.: 1,399

[22] Filed: Jan. 7, 1993

Related U.S. Application Data

[63] Continuation of Ser. No. 737,602, Jul. 25, 1991, abandoned, which is a continuation of Ser. No. 309,233, Feb. 13, 1989, abandoned.

[30] Foreign Application Priority Data

Feb. 11, 1988 [FR] France .............................. 88 01621

[51] Int. Cl.⁶ .......................... C08K 3/36; C08K 3/32; C08K 3/22
[52] U.S. Cl. .................................. 524/437; 524/414; 524/418; 524/556; 524/559
[58] Field of Search ............... 524/399, 414, 417, 418, 524/423, 437, 441, 445, 446, 556, 559; 423/306

[56] References Cited

U.S. PATENT DOCUMENTS 3,284,380 11/1966 Davis .
3,953,421 4/1976 Berstein ................................ 524/446
4,416,941 11/1983 Barsotti ................................ 524/441
4,620,992 11/1986 Nojima .

FOREIGN PATENT DOCUMENTS 1257042 10/1989 Japan .

*Primary Examiner*—Christopher Henderson
*Attorney, Agent, or Firm*—Burns, Doane, Swecker & Mathis

[57] ABSTRACT

Stable aqueous suspensions of precipitated silica, well adopted as coatings for the papermaking industry, include an aqueous suspension of a slaked precipitated silica filter cake and an effective amount of a stabilizer therefor, which stabilizer contains (a) aluminum or an aluminum compound, and (b) an anionic dispersing agent.

9 Claims, No Drawings

AQUEOUS SUSPENSIONS OF PRECIPITATED SILICA WITH ANIONIC DISPERSANT AND ALUMINUM COMPOUND

This application is a continuation of application Ser. No. 07/737,602, filed Jul. 25, 1991, now abandoned, which is a continuation of application Ser. No. 07/309,233, filed Feb. 13, 1989, now abandoned.

BACKGROUND OF THE INVENTION

1. Field of the Invention

The present invention relates to improved stable aqueous suspensions of precipitated silica and to the use of such suspensions in the papermaking industry.

2. Description of the Prior Art

Aqueous suspensions or slurries of silicas are used in a number of different fields, in particular in the papermaking industry, for coating paper.

Such suspensions have a tendency to undergo sedimentation or gelling, which makes it difficult for them to be transported or stored. Indeed, in very many cases, following transportation of the suspension, or after storage thereof over a time period of greater or lesser length, the formation of a gel or the deposit of a hard layer of pigment, above which exists a slurry which is more fluid but which has a low content of dry solids, is observed. Also, it is often impossible to convert the silica back into a state of suspension, or to produce a slurry which is of sufficiently low viscosity as to be pumpable and therefore capable of being used in an industrial setting. Serious need exists in this art for a solution to these particular problems.

SUMMARY OF THE INVENTION

Accordingly, a major object of the present invention is the provision of improved aqueous suspensions of silica which are stable, non-gelling, pumpable and readily dispersible after several days of storage.

Briefly, the present invention features stable aqueous suspensions of silica which comprise (a) a precipitated silica constituting a filter cake resulting from the precipitation reaction and which is slaked; (b) aluminum or an aluminum compound; and (c) an anionic dispersing agent.

DETAILED DESCRIPTION OF THE PREFERRED EMBODIMENTS OF THE INVENTION

More particularly according to the present invention, it has now surprisingly been found that after storage over a long period of time ranging from several days to several months, the subject novel suspensions exhibited no or only slight sedimentation, and in every case remained of suitable viscosity.

The suspensions according to the invention are essentially based on a precipitated silica. By "precipitated silica" is intended any silica produced by the reaction of a silicate with an acid. The silica may be prepared using any method (addition of acid to a silicate sediment or bottoms material, simultaneous total or partial addition of acid and silicate to a bottoms material of water or silicate solution, and the like), and it will be selected depending upon the type of silica sought to be produced and, therefore, also the use which is to be made of the suspension. By way of example, in accordance with the present invention it is possible to use silicas which, when dried, have a BET surface area according to the standard NFX 11-622 (3.3) which is generally less than 400 $m^2/g$ and preferably ranges from 50 to 400 $m^2/g$, and oil absorption levels according to the standard NFT 30-022 (march '53), using dibutyl phthalate, which can range from 50 to 400 $cm^3/100$ g.

In accordance with the invention, the precipitated silica from the suspension comprises the filter cake which results from the precipitation reaction. In other words, the silica is precipitated, the reaction medium is filtered and the result is a filter cake which is washed if necessary. The cake is then slaked, thus forming a suspension. That suspension may be stabilized according to the invention by the system which will now be described.

That system comprises two constituents.

The first constituent is aluminum or a compound of aluminum. In a preferred embodiment of the invention, the aluminum is used in the form of sodium aluminate. However, also within the ambit of the present invention, it is also possible to use any compound of aluminum which performs the same function without adversely affecting the properties of the silica, such as, for example, aluminum chloride, acetate, phosphate, sulfate and nitrate and alkali metal and alkaline earth aluminates.

The aluminum or the aluminum compound may be introduced in the operation of actually preparing the silica, that is to say, during the precipitation step or subsequently. However, it is preferable for it to be added either to the abovementioned filter cake, or at the moment at which the filter cake is slaked.

It is also preferable for the proportion of aluminum, expressed in terms of anhydrous alumina with respect to the amount of anhydrous silica, to be within a certain range, generally from 500 to 10,000 ppm and more particularly from 1,000 to 6,000 ppm. Outside these limits, the aluminum may not have any effect or it may even interfere with the stabilization.

The second constituent of the stabilizing system is the anionic dispersing agent.

It is preferably selected from among:

(i) polymers of acrylic and methacrylic acid and salts thereof;

(ii) homopolymers of $\alpha$- and $\beta$-unsaturated dicarboxylic acids, such as, for example, maleic or itaconic acids;

(iii) copolymers of (meth)acrylic acid and an $\alpha$- and $\beta$-unsaturated dicarboxylic acid;

(iv) copolymers of (meth)acrylic acid and $\alpha$- and $\beta$-unsaturated dicarboxylic acids with an alkene, a (meth)acrylate ester, a copolymerizable hydrophobic monomer, such as, for example, styrene or a copolymerizable hydrophilic monomer, such as, for example, allyl alcohol; polyphosphates and sodium, potassium and ammonium salts thereof, polyphosphonates and sodium, potassium and ammonium salts thereof, and polysulfonates and sodium, potassium and ammonium salts thereof.

Particularly preferred are the polyacrylates or methacrylates, in particular of sodium, potassium or ammonium.

The dispersing agents will preferably be used that have a mean molecular weight of from 1,000 to 20,000.

The amount of dispersing agent generally ranges from 0.05% to 1.5% and in particular from 0.1% to 0.9% by weight with respect to the anhydrous silica.

Moreover, in another preferred embodiment of the invention, the silica of the suspension is subjected to a crushing operation. The silica is crushed in order to essentially produce a product of a narrower granulometric distribution. That granulometry is such that typically the dispersion index is at most 0.7. The dispersion index is given by the following ratio:

$$\frac{d84 - d16}{2d50}$$

in which $d_n$ is the diameter in respect of which there are n % of particles of a size smaller than that value. The crushing operation is carried out in such manner as to produce, for example, a silica which has a median particle diameter of from 0.5 to 10 μm, more particularly from 1 to 5 μm.

It has also been found that the crushing operation makes it possible to increase the stability of the slurry in respect of time.

The method of preparing the suspension according to the invention is not critical. Generally, the silica, the slurry resulting from the slaking of the cake and containing the required amount of aluminum and the dispersing agent are mixed in a tank and then, if appropriate, the resulting mixture is transferred into a crusher. It is possible, however, to introduce the aluminum and/or the dispersing agent only after the crushing stage.

The final pH-value of the suspension ranges, in practice, from 3 to 7 and more particularly from 3 to 5.5.

Finally, the proportion of dry solids is generally at least 15% and preferably higher than 20%.

The stable suspensions produced as described above may advantageously be used in the papermaking industry for coating paper or cardboard and for the preparation of light-weight paper.

It will be appreciated that the suspensions of the invention are suitable for all of the known uses of that type of product, such as, for example, as polishing compositions, additives for concrete and building materials, additives for paints, inks, glues, varnishes, etc.

In order to further illustrate the present invention and the advantages thereof, the following specific examples are given, it being understood that same are intended only as illustrative and in nowise limitative.

EXAMPLE 1

A filter cake resulting from the precipitation of a silica was used. The cake was slaked by the addition of sodium aluminate. The suspension produced had a proportion of dry solids of 21.7%, an amount of aluminum of 4,100 ppm and a pH of 5.7. The silica had a median diameter of 10 μm and dispersion index of 1.

A sodium polyacrylate (COATEX P50 from COATEX) of a mean molecular weight of 7,000 was added to the suspension in a proportion of 0.5% with respect to the anhydrous silica.

After storage for 5 days, a sedimentary volume (solid volume/total volume) of 5% was observed for suspension having a pH of 5.5.

Slight agitation permitted the product to be converted back into a state of suspension.

EXAMPLE 2

The same suspension as in Example 1, with the same stabilizing system as described above, was used, but it was crushed by charging it into a Dyno laboratory crusher of type KDL.

The crushing volume was 0.6 l, while the crushing speed was 3,000 rpm and the suspension was introduced at a flow rate of 150 cm$^3$/minute.

The result obtained was a suspension of a silica of a median diameter of 1.9 μm with a dispersion index of 0.36.

After storage for 60 days, a sedimentary volume of 2% was observed. The viscosity of the suspension, as measured with a RHEOMAT 115 viscosimeter, was then 25 mPa.s, and its fluidity was excellent.

COMPARATIVE EXAMPLE 3

The cake of Example 1 was used, but without a stabilizing agent.

After storage for 5 days, total gelling was observed. It was impossible to restore it to the state of a suspension.

COMPARATIVE EXAMPLE 4

A silica was prepared and dried by atomization of the slaked cake of Example 1.

It had a BET surface area of 180 m$^2$/g and an oil absorption level of 300 cm$^3$/g. The median diameter was 1.7 μm, the ignition weight loss at 900° C. was at most 11.5% and the pH in a 5% aqueous suspension was 6.8.

It was converted back into a 21.7% suspension. The polyacrylate was added to the suspension, in the same amount as in Example 1.

Total gelling was observed after 5 days.

This Example shows that the behavior of a silica suspension obtained from a finished and dried product has nothing to do with that of a suspension of a silica which results from a filter cake.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A stable aqueous suspension of silica values, comprising an aqueous suspension of a slaked precipitated silica filter cake and an effective amount of a stabilizer comprising sodium aluminate and an anionic dispersing agent comprising sodium polyacrylate or polymethacrylate.

2. The stable aqueous suspension as defined by claim 1, wherein the amount of aluminum, expressed in terms of anhydrous alumina with respect to the amount of anhydrous silica, ranges from 500 to 10,000 ppm.

3. The stable aqueous suspension as defined by claim 1, wherein the amount of said anionic dispersing agent ranges from 0.05% to 1.5% by weight with respect to the anhydrous silica.

4. The stable aqueous suspension as defined by claim 1, in crushed state.

5. The stable aqueous suspension as defined by claim 4, the silica having a granulometry such that its dispersion index is at most 0.7.

6. The stable aqueous suspension as defined by claim 1, having a pH of from 3 to 7.

7. The stable aqueous suspension as defined by claim 6, having a pH of from 3 to 5.5.

8. The stable aqueous suspension as defined by claim 1, having a dry solids content of at least 15%.

9. The stable aqueous suspension as defined by claim 1, having a dry solids content of at least 20%.

* * * * *